United States Patent
Gelber et al.

[11] 3,736,047
[45] May 29, 1973

[54] LIQUID CRYSTAL DISPLAY DEVICE WITH INTERNAL ANTI-REFLECTION CASTING

[75] Inventors: Robert M. Gelber, Healdsburg; Edward A. Small, Jr., Santa Rosa, both of Calif.

[73] Assignee: Optical Coating Laboratory, Inc., Santa Rosa, Calif.

[22] Filed: Aug. 13, 1971

[21] Appl. No.: 171,572

[52] U.S. Cl............350/160 LC, 350/164, 340/324 R
[51] Int. Cl.................................................G02f 1/16
[58] Field of Search.....................350/160 LC, 160 P, 350/267, 164, 166; 340/324 R

[56] References Cited
UNITED STATES PATENTS

| | | | |
|---|---|---|---|
| 2,543,793 | 3/1951 | Marks | 350/267 |
| 3,647,280 | 3/1972 | Klein et al. | 350/160 LC |
| 3,185,020 | 5/1965 | Thelen | 350/164 |
| 3,576,356 | 4/1971 | Hyman | 350/164 |
| 2,892,380 | 6/1959 | Baumann et al. | 350/160 LC |
| 3,637,294 | 1/1972 | Berthold | 350/166 |

*Primary Examiner*—Ronald L. Wibert
*Assistant Examiner*—Ronald J. Stern
*Attorney*—Flehr, Hohbach, Test, Albritton & Herbert

[57] ABSTRACT

Liquid crystal display device having first and second substantially transparent insulative plates having front and rear surfaces with said plates being arranged so that the rear surface of the first plate and the front surface of the second plate face each other. An antireflection coating is disposed on at least one of said front and rear surfaces of said front plate. A conducting coating is carried on said rear surface of said first plate and said front surface of said second plate. Means secures the first plate to the second plate so that there is a space provided between said conducting layers. A layer of liquid crystal material is disposed in said space.

In the method, an antireflection coating is provided on a surface so that the pattern carried by the display device is invisible when the display device is not activated.

13 Claims, 6 Drawing Figures

3,736,047

INVENTOR.
Robert M. Gelber
Edward A. Small, Jr.
BY
Flehr, Hohbach, Test,
Albritton & Herbert
Attorneys

LIQUID CRYSTAL DISPLAY DEVICE WITH INTERNAL ANTI-REFLECTION CASTING

BACKGROUND OF THE INVENTION

Liquid crystal display devices have heretofore been provided. To enhance the contrast of the display device when using only ambient light, it has been advantageous to use a reflecting material at the rear of cell cavity to reflect scattered light back out the front of the cell. Typically, an aluminum film has been used for this purpose. It also serves as a conducting pattern at the rear of the cell. The aluminum, however, has the disadvantage that it will not withstand temperatures high enough to permit the use of glass frit for sealing purposes. In addition, the aluminum cannot be continuous because of the necessity to provide conductive leads to the pattern at the front of the cell. Attempts have been made to overcome the first difficulty by using low temperature sealing means such as an epoxy. However, it has been found that such seals lead to eventual contamination and a short cell life. Another attempt has been made to utilize high temperature material such as noble metals for the reflecting material. However, in this case, the cost is high and sneak paths for the conductive leads are still required.

In addition to these difficulties with the prior art display devices, the transparent conducting material used on the front plate, usually indium oxide or tin oxide, has a higher index of refraction than the glass on which it is used so that the higher and/or color reflectance from the conducting material causes the pattern deposited on the front plate to be somewhat visible even when the cell is not activated. Contrast is also reduced from reflectance from the outer front surface of the cell itself. There is, therefore, a need for a new and improved liquid crystal display device and a method for making the same.

SUMMARY OF THE INVENTION AND OBJECTS

The liquid crystal display device consists of first and second substantially transparent insulative first and second plates with each plate having front and rear surfaces. The first and second plates are disposed so that the rear surface of the first plate and the front surface of the second plate face each other and are spaced apart. An antireflection coating is disposed on the front surface and also on the rear surface of the first plate. Means is provided for securing the first plate to the second plate and to form a hermetically sealed space between the rear surface of the first plate and the front surface of the second plate. A liquid crystal material is disposed in said space and fills said space. A conducting layer is carried by the rear surface of the first plate and another conducting layer is carried by the front surface of the second plate so that the conducting layers are in contact with the liquid crystal material.

In the method for making liquid crystal display devices, antireflection coatings are formed on certain of the surfaces so that the display will not be visible when a liquid crystal display device is inactive.

In general, it is an object of the present invention to provide a liquid crystal display device and method in which the pattern is substantially invisible when the display device is not activated.

Another object of the invention is to provide a liquid crystal display device and method of the above character in which contrast is increased by reducing reflectance from the outer front surface of the display device.

Another object of the invention is to provide a display device and method of the above character in which an improved back reflector is utilized.

Another object of the invention is to provide a display device and method of the above character in which a non-conducting back reflector is utilized.

Another object of the invention is to provide a display device and method of the above character in which the device can be frit sealed.

Another object of the invention is to provide a display device and method of the above character which can be utilized either in conjunction with reflection or transmission.

Another object of the invention is to provide a display device and method of the above character in which the display device can be readily and economically fabricated.

Additional objects and features of the invention will appear from the following description in which the preferred embodiments are set forth in detail in conjunction with the accompanying drawing.

DESCRIPTION OF THE PREFERRED EMBODIMENTS

Figure 1:
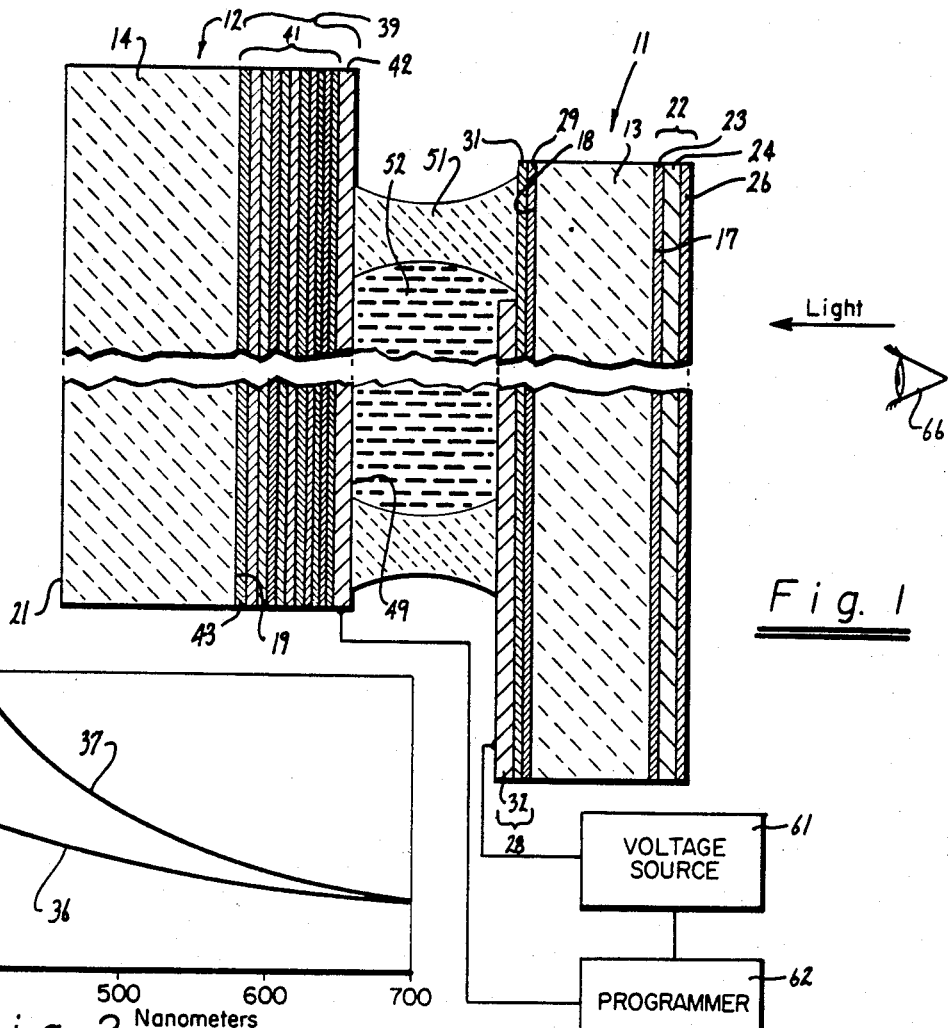
FIG. 1 is an enlarged cross-sectional view of a liquid crystal display device incorporating the present invention.

The liquid crystal display device consists of substantially transparent insulative front and rear plates 11 and 12. The front plate 12 includes a substrate or body 13 and the rear plate 12 includes a substrate or body 14. Both of the substrates 13 and 14 are formed of a suitable transparent material which has insulating properties as, for example, glass. A typical glass which can be utilized for this purpose is a soda lime glass having an index of refraction of approximately 1.52. By way of example, one-eighth inch float glass can be utilized because its surfaces are quite flat.

The substrate or body 13 is provided with front and rear spaced generally planar parallel surfaces 17 and 18, whereas the substrate or body 14 is provided with spaced generally parallel planar surfaces 19 and 21. An antireflection coating 22 is provided on the front surface 17 of the substrate 13. The antireflection coating 22 can be of the type described in Thelen U.S. Pat. No. 3,185,020. As described therein, the antireflection coating can be formed of three layers 23, 24 and 26 to provide a non-absorbing, substantially colorless multilayer antireflection coating which is disposed on the normal light reflecting surface 17. The three layers are formed of three different materials having three different indices of refraction. Assuming that the glass substrate 13 has an index of refraction of 1.52, the layer 23 should be formed of a material having a medium index of refraction ranging from 1.8 to 1.85, the layer 24 should be formed of a material having a high index of refraction ranging from 1.9 to 2.3 and the layer 26 should be formed of a material having a low index of refraction of approximately 1.38. The layers 23 and 26 should have an optical thickness of one-quarter of the design wavelength of the antireflection coating, whereas the layer 24 should have an optical thickness of one-half of the design wavelength of the antireflection coating. As explained in U.S. Pat. No. 3,185,020, a number of materials can be utilized to meet the requirements for a suitable antireflection coating in which the layer 23, the first layer counting from the substrate 13, can be formed of cerium fluoride, the second layer 24 can be formed of zirconium oxide and said third layer can be formed of magnesium fluoride. Such an antireflection coating will produce a reflectance which is essentially below 1 percent across the whole visible spectrum ranging from 400 millimicrons to 700 millimicrons.

Another antireflection coating which would be suitable for use on the surface 17 is described in Rock U.S. Pat. No. 3,432,225 and consists of four layers and two materials with one of the materials having a high index of refraction and the other of the materials having a low index of refraction. The first and second layers counting from the substrate are formed of the two materials and have combined optical thicknesses equal to approximately one-quarter of the design wavelength of the antireflection coating. The third layer is formed of a high index material and has an optical thickness of approximately one-half of the design wavelength of the antireflection coating. The fourth layer is formed of a material having a low index of refraction has an optical thickness of approximately one-quarter of the design wavelength of the antireflection coating. Various materials can be utilized as described in U.S. Pat. No. 3,432,225 for the high and low index materials. Thus, for example, zirconium oxide can be utilized for the high index material and magnesium fluoride for the low index material.

A combination antireflection and conducting coating 28 is provided on the surface 18 of the substrate 13 and consists of three layers 29, 31 and 32 which can be identified as first, second and third layers counting from the substrate. The first layer 29 is preferably formed of a high index material having an index of refraction ranging from 1.9 to 2.3. Materials having indices of refraction within this range are zirconium oxide ($ZrO_2$), Neodymium oxide ($Nd_2O_3$), tantalum oxide ($TaO_2$) indium oxide ($InO_2$), titanium oxide ($TiO_2$), silicon dioxide ($SiO_2$), and certain mixed oxides of the type disclosed in Kraus et al. U.S. Pat. No. 3,034,924. The second layer is formed of a low index material having an index of refraction in the vicinity of 1.38. Materials such as magnesium fluoride ($MgF_2$) and zinc cryolite can be used.

The layers 29 and 31 form a high-low index combination which is formed of non-conducting or insulating materials. The layer 32 also forms a part of the antireflection coating as hereinafter described and is formed of a conducting material such as indium oxide ($In_2O_3$) or tin oxide ($SnO_2$). The conducting layer is deposited to a suitable thickness as, for example, to a thickness having a conduction between 500 to 1,000 ohms/square.

Suitable photolithographic or silk screen resist methods of a type well known to those skilled in the art are utilized for forming the desired conducting pattern in the conducting layer 32. Thus, by way of example, a photoresist can be applied to the layer 32. The photoresist can then be exposed through a suitable mask having the desired pattern therein. Thereafter, the photoresist can be developed and the undeveloped portions removed to expose portions of the conducting layer 32 which it is desired to remove to provide the desired pattern in the conducting layer 32. A suitable etch is then utilized to remove the exposed portions of the layer 32 using the remaining photoresist as a mask so that there remains the desired pattern in the conducting layer.

By way of example, one combination antireflection and conducting coating 28 which was found to be particularly satisfactory was one in which the first layer 29 was formed of titanium dioxide having a quarter wave optical thickness of 140 nanometers. The second layer 31 was formed of magnesium fluoride and had a quarter wave optical thickness of 193 nanometers. The layers 29 and 31 were both non-conducting layers. The conducting layer 32 was formed of indium oxide and had a quarter wave optical thickness of 1,100 nanometers. The optical thicknesses of the layers was chosen using the design wavelength for the antireflection coating which was in the center of the region of interest, namely from 400 to 700 nanometers which is the visible spectrum. The optical thicknesses set forth for this design can be varied within ± 5 percent to make allowance for production variations while still retaining the desired characteristics of the coating.

One of the principal characteristics desired for the front plate 11 of the liquid display device is that the pattern carried by the front plate 11 be invisible or substantially invisible to the naked eye when the device is not activated. To accomplish this objective, it is necessary that both the conducting and non-conducting parts of the combination antireflection and conducting coating 28 be relatively low in reflectance and that the two layers 29 and 31 have substantially the same appearance to the visible eye as the three layers 29, 31 and 32. In other words, the reflection of the coating 28 must be low, i.e., in the same order as that of glass and also the color of the coating must be substantially the same to the naked eye with and without the conducting layer 32. These characteristics have been obtained with the design set forth above.

Figure 2:
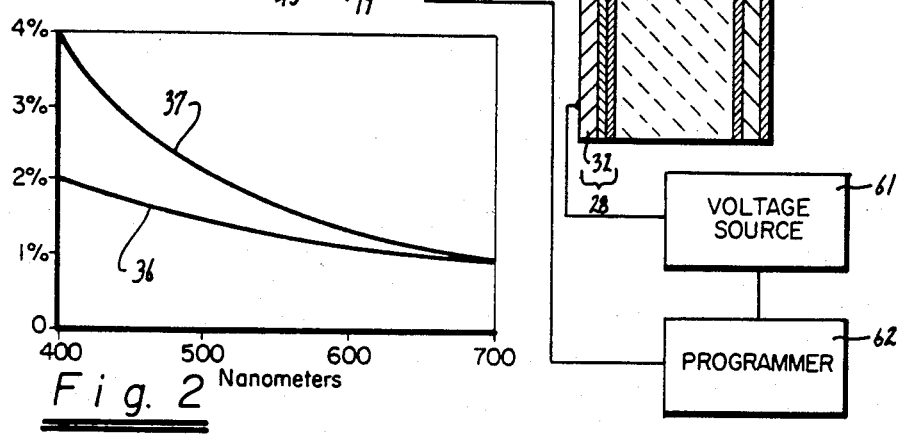
FIG. 2 is a graph showing the reflectance of the conducting and non-conducting parts of the pattern formed on the front plate of the liquid crystal display device shown in FIG. 1.

In FIG. 2 there is shown a graph showing the reflectance in percent from 400 to 700 nanometers for the combination antireflection and conducting coating 28. Curve 36 shows the reflectance of the combined three layers 29, 31 and 32, whereas curve 37 shows the reflectance of the coating 28 in those regions where the conducting layer 32 has been removed; in other words, the conducting third layer is not present and only the non-conducting layers 29 and 31 enter into the reflectivity. As can be seen, both curves 36 and 37 are very similar in reflectance with both curves increasing in reflectance toward the 400 nanometer region which makes the coating slightly bluish in color and virtually identical in intensity to the eye. Both of the curves 36 and 37 have approximately the same average reflection, that is, the average level of intensity is approximately the same so that one portion of the coating does not appear brighter than another portion in which the conducting layer has been removed. For these reasons, the eye is incapable of distinguishing whether two layers or three layers are present in the various portions of the coating 28.

From the foregoing, it can be seen that the antireflection coating 22 is designed so that it is achromatic, whereas the coating 28 is designed so that it is chromatic, i.e., has some color. Although the design selected gives a slightly bluish color, it is apparent that, if desired, other designs can be utilized giving different colors. However, it is believed that blue is a very desirable color for the present application of the invention because the eye is less sensitive to different shades of blue. It is for this reason that although there is some slight difference in the reflectivity in the blue region for the two and three layer combinations as represented by the curves 36 and 37, this slight difference cannot be discerned by the human eye.

The indium oxide layer by itself would have a slightly magenta appearance by reflection which is a combination of reflection in the blue plus reflection in the red. The two dielectric layers 29 and 31 in combination with the conducting layer 32 serve to minimize the reflection in the red by the layer 32 so that the three layers together appear blue. The two dielectric layers 29 and 31 by themselves give a reflection in the blue so that the appearance of the etched coating 28 is to give a relatively uniform blue appearance even though portions of the conducting layer 32 have been removed.

The multilayer antireflection coatings 22 and 28 can be deposited in the conventional manner within the vacuum chamber with conventional processing techniques.

The rear plate 12 consists of a substrate 14 having a multilayer dielectric coating or stack 41 deposited on the normal light reflecting surface 19. A conducting layer 42 is provided on the multilayer stack 41. It is a requirement that all of the coatings carried by the front and rear plates 11 and 12 be able to withstand a temperature of at least 500°C. for a purpose hereinafter described. In addition, it is a requirement that the multilayer dielectric coating 41 be continuous, nonconducting, substantially neutral in color throughout the visible spectrum, namely, 400 to 700 nanometers, and reflect at least 90 percent of the visible light striking the same.

It is also a requirement for the coatings carried by the front and rear plates 11 and 12 that they not react with the liquid crystal material which is to be utilized in the device.

The dielectric layers 31 and 29 and the multilayer dielectric coating 41 both must be capable of supporting a conducting layer which is relatively invisible. The dielectric reflector should approach as close as possible the reflectivity of an aluminum layer and its neutrality in color.

It is also a requirement that the dielectric layers which are utilized be able to resist the etch which is utilized for etching the conducting layer deposited on the dielectric layers.

In order to achieve the desired amount of reflectance, it is desirable that the dielectric coating 41 be formed of a plurality of layers of high and low index materials. At least seven of such layers should be utilized although it is preferable that 11 or more layers be utilized. Thus, the multilayer coating 41 is formed of a plurality of separate layers 43 with the odd numbered layers counting from the medium being formed of a high index material and even numbered layers being formed from a low index material. Titanium dioxide and zirconium oxide can be utilized as high index materials, whereas silicon dioxide or Vycor or magnesium fluoride ($MgF_2$) can be utilized as low index materials. It is desired that the multilayer stack be designed such that a high index layer is next to the surface 19.

After the multilayer stack has been formed, the conducting coating 42 is formed on the stack. This conducting coating can be formed of a suitable conducting material such as indium oxide or tin oxide. The desired pattern is formed in the conducting layer 42 in the same manner as the pattern is formed in the conducting layer 32. For example, photolithographic techniques in combination with a suitable etch can be provided to remove the undesired portions of the conducting layer 42 to provide the necessary pattern.

One design which has been found to be satisfactory for the multilayer stack 41 and the conducting coating 42 is set forth below:

| LAYER | CODE | INDEX | DESIGN THICKNESS IN NANOMETERS |
|---|---|---|---|
| 1 | C | 2.000 | 1100 |
| 2 | H | 2.315 | 470 |
| 3 | L | 1.450 | 470 |
| 4 | H | 2.315 | 470 |
| 5 | L | 1.450 | 470 |
| 6 | H | 2.315 | 545 |
| 7 | L | 1.450 | 620 |
| 8 | H | 2.315 | 620 |
| 9 | L | 1.450 | 620 |
| 10 | H | 2.315 | 620 |
| 11 | L | 1.450 | 620 |
| 12 | H | 2.315 | 620 |

For the above, the index of refraction for the medium was 1.5, whereas the index of the substrate was considered to be 1.52. The reference or design wavelength was 550 nanometers. The first layer counting from the medium which is a conducting layer and bearing the code C was formed of indium oxide having an index refraction of 2.0 and a half wave optical thickness of 1,100 nanometers. The high index material was titanium dioxide and the low index material was silicon dioxide; however, Vycor could be used in place of silicon dioxide.

Figure 3:
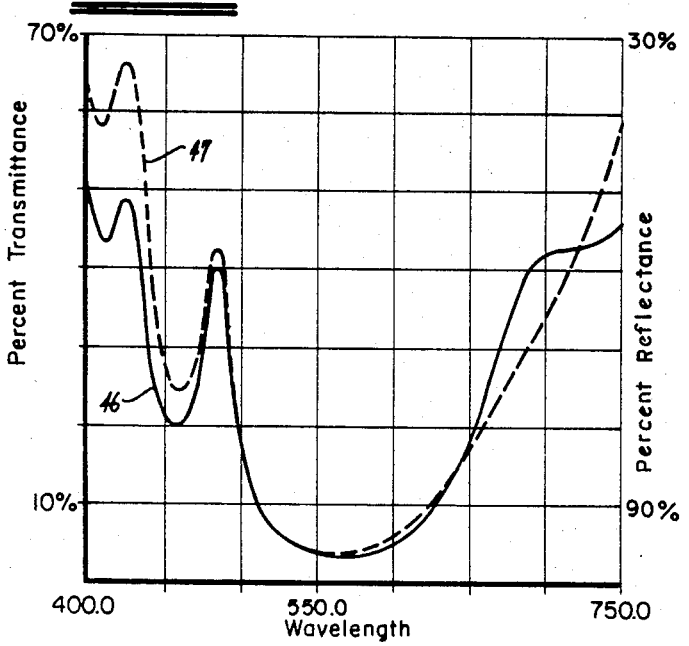
FIG. 3 is a graph showing the transmittance of the conducting and non-conducting parts of the pattern formed on the rear plate of the liquid crystal display device shown in FIG. 1.

The spectral performance of such a design is shown in FIG. 3 in which the curve 46 represents the percent transmittance which is obtained from the dielectric stack 41 by itself and the curve 47 represents the transmittance from the combination of the dielectric stack 41 and the conducting layer 42. From these curves, it can be seen that the reflectance for the dielectric coating by itself and in combination with the conducting layer 42 are quite similar. In addition, it can be seen that the reflectance is substantially greater than 90 percent for the dielectric coating 41 by itself in the region of greatest eye sensitivity at the center of the visual spectrum.

Thus, it can be seen that the combination antireflection and conducting coating 39 functions in a manner similar to the combination antireflection and conducting coating 28 in that it will have a substantially uniform appearance and the pattern will not be visible when the device is not activated.

As soon as the necessary coatings have been provided on the front and rear plates 11 and 12, a conventional glass frit, such as supplied by Corning Glass Works, is placed on the outer margins of the combination coatings 28 and 39 and then the two front plates are placed so that the surfaces 18 and 19 face each other. The patterns carried by the conducting layer 32 and the conducting layer 42 must be in registration with a spacing between the coatings carried by the front and rear plates of 5 to 25 microns and preferably approximately 0.001 of an inch. The glass frit is then fired for an appropriate period of time at a temperature of approximately 500°C. to form a glass frit seal 51 which circumscribes a predetermined area on both of the front and rear plates 11 and 12 to provide an enclosed space 49. The glass frit seal 51 provides an excellent seal which bonds the front and rear plates to each other and which also establishes a seal which is impervious to moisture. Since the front and rear plates are also imprevious to moisture, moisture cannot contaminate a liquid crystal material 52 which is placed within the hermetically sealed space 49. The liquid crystal material 52 can be placed in the space 49 by drilling one or more small holes in one of the front or rear plates 11 and 12 and then filling the space 49 through these holes and then plugging the holes with some inert material such as a silicon type compound. Since the liquid crystal layer is only this thick, it is held between the front and rear plates by capillary action.

The liquid crystal material or composition can be of any suitable type. As is well known to those skilled in the art, liquid crystals are fluids that have certain crystalline properties and which respond to an electric field by becoming cloudy or changing color. There are three types of liquid crystal compositions which are termed nematic, smectic and cholesteric. The two liquid crystal compositions of the most interest for the present invention are the nematic and the cholesteric. Suitable nematic liquid crystal compositions are disclosed in U.S. Letters Pat. No. 3,499,702. Materials exhibiting smectic and cholesteric properties are disclosed in an article entitled "Liquid Crystal Display Devices" by George H. Heilmeier appearing in the Apr. 1970 issue of Scientific American, Vol. 222, No. 4, pages 100–106.

Figure 4:
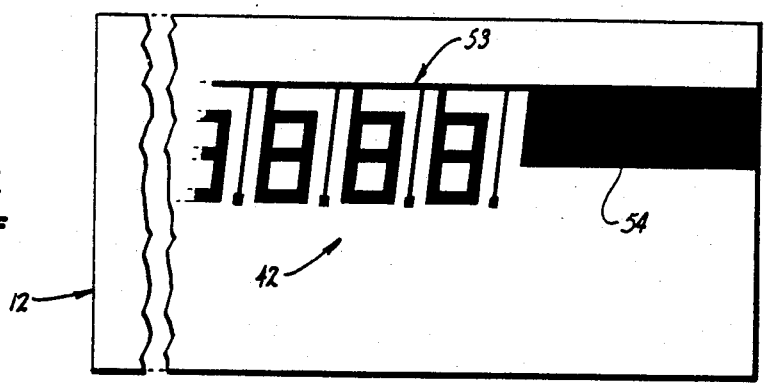
FIG. 4 is a partial plan view showing the rear plate of the liquid crystal display device in FIG. 1 with a pattern formed thereon.
Figure 5:
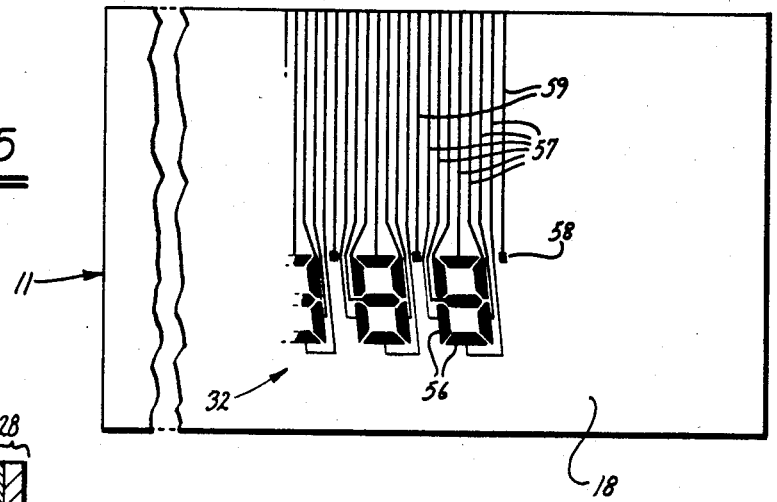
FIG. 5 is a partial plan view showing the front plate of the liquid crystal display device in FIG. 1 with a pattern formed thereon.

Let it be assumed that the front and rear plates 11 and 12 have patterns on them as shown in FIGS. 4 and 5 so that the liquid crystal display device can serve as a display device for displaying numerals. When such is the case as shown in FIG. 4, the pattern 53 is continuous and is connected to a single pad 54. As shown in FIG. 5, the pattern on the front plate 11 is formed of discontinuous segments 56 which are utilized to form the numerals arranged in a pattern well known to those skilled in the art and which are connected to leads 57 which extend downwardly to the bottom edge of the plate 11. In addition, there are provided periods 58 between each numeral which are connected by leads 59 also extending downwardly to the bottom edge.

When the front and back plates are fritted together as shown in FIG. 1, the lower extremity of the front plate 11 extends below the rear plate so that contact can be made to the various leads 57 and 59. A suitable voltage can be applied across the conducting layers carried by the front and rear plates in a conventional manner such as by use of a voltage source 61 which has one terminal connected to the contact pad 54 of the rear plate 12 and has the other terminal connected to a programmer 62 which can be an integrated circuit that is connected to the leads 56 and 58 and is utilized for programming which of the segments 56 and which period 58 should be energized to provide the desired numerical display on the display device.

As is well known to those skilled in the art, when a voltage is applied across the two conducting plates on opposite sides of the liquid crystal composition 52, the portions of the liquid crystal composition between the portions of the pattern having the voltage across the same will become milky. It is believed that this milky condition is caused by the fact that the electric dipole moment (the resultant force set up in the molecule by the electric field) does not lie along the main molecular axis. Instead, nematic molecules, which are long and cylindrically shaped, have an oxygen-carbon appendage that causes the molecular moment to be at an angle with respect to the molecular axis. Because of this arrangement, the molecules cannot align with their dipole moment in the direction of the field when an electric field is applied to a thin film of this material. Instead, the axes of the molecules remain at some angle with respect to the electric field. Under the influence of the electric field, ions travelling in the liquid crystal material disrupt the normal orientation pattern of the molecules. Some molecules are forced to line up in a direction of the local field around the ion, giving rise to regions of discontinuity in the molecular distribution. This discontinuity representing a region of changing index of refraction forms scattering centers for light incident on the liquid crystal material. Thus, when a voltage is applied to the liquid crystal device, light which normally would pass through the liquid crystal material suddenly scatters, rendering the liquid milky or opaque. These scattering centers, which have diameters of 1 to 5 microns, are 5 to 10 times larger than the wavelength of the incident light and for that reason the scattering effect is essentially independent of wavelength. The light scatters in the forward direction, that is, in the same general direction in which the light was travelling initially. Thus, in the present liquid crystal device with the device operating on reflected light, the light would be travelling in the forward direction as indicated by the arrow in FIG. 1 and would pass through the front plate 11 and strike the nematic liquid crystal material and be scattered in the same direction. The light would be reflected back to the viewer by the dielectric reflecting coating 41. The contrast between the regions where no scattering takes place and the regions where scattering does take place makes the number to be displayed visible to the naked eye.

If the light travelling through the liquid crystal display device is a white light as, for example, from a fluorescent light, the color of the reflector will be the color of the numerals. The color of the numeral will be a product of the color of the light source times the color of the reflector. Thus, if the reflector is slightly bluish, the numeral display may have a slight color as, for example, it may be a lime green or, in other words, slightly greenish. An advantage of the liquid crystal display device using reflection is that the greater the ambient light level, the more visible will be the pattern being displayed.

Figure 6:
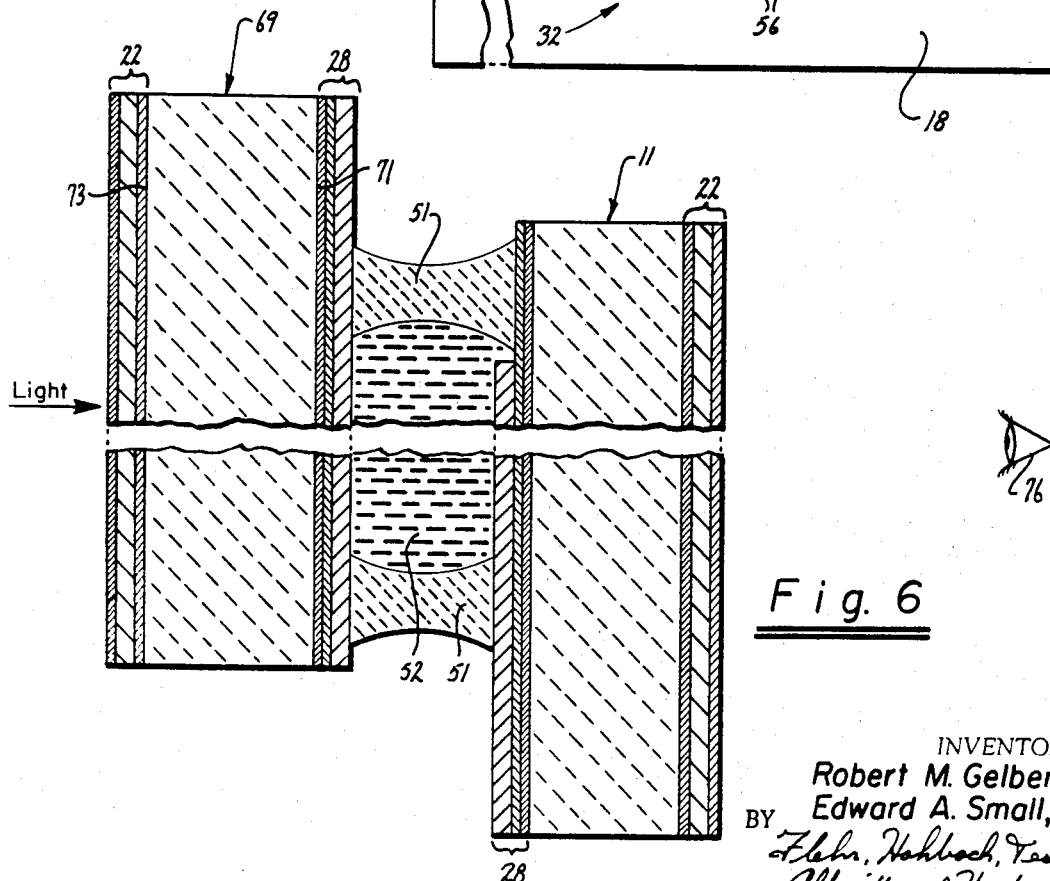
FIG. 6 is a cross-sectional view showing another embodiment of the liquid crystal display device incorporating the present invention.

If it is desired to have a liquid crystal display device work other than by ambient light and using a reflective type cell or device, it is necessary to provide a different type of cell or device as, for example, one which is of the transmission type. A cell of this type is shown in FIG. 6. In such a case, the back plate does not utilize a reflector. It just carries a pattern. The front plate 11 would be identical to the front plate utilized in the previous embodiment. The back plate 69, however, would be significantly different from the back or rear plate 12 in that a reflector has been eliminated from the coating facing the liquid crystal material 52. The back or rear plate 69 is very similar to the front plate 11 and has a combination antireflection and conducting coating 28 identical to that hereinbefore described and is formed on the front surface 71 of the glass substrate 69. The only difference is that the pattern which is provided in the conducting layer 32 of the coating 28 is the pattern carried by the conducting layer 42 of the combination antireflection and conducting layer 39. If desired, an antireflection coating 22 can be provided on the rear surface 73.

The front plate 11 and the rear plate 69 are formed into a cell in the same manner as the cell or device hereinbefore described. In order to make the pattern visible, it is necessary to provide light as, for example, from a lamp, on the rear side of the cell as indicated by the arrow in FIG. 6 so that it would be visible to the viewer 76 on the front side of the liquid crystal display device.

The pattern being displayed will have the color of the light being utilized for illumination of the display device times the transmission of the cell, because the only light which will be seen is the scattered light from the light source which is scattered by the liquid crystal material in the manner hereinbefore described. When the light source is off, then in the display device it may be possible to see a faint reflected color of blue with no pattern due to ambient lighting.

From the foregoing, it can be seen that there has been provided a liquid crystal display device utilizing antireflection coatings to great advantage to make the pattern invisible or substantially invisible when the display device is not activated. Contrast is also increased by reducing the reflectance form the outer front surface of the cell or device. The liquid crystal display device can be either of the reflective type or the transmission type. In either case, the pattern is virtually invisible to the naked eye when the display cell or device is not activated. In addition, the antireflection coatings enhance the optical properties of the liquid crystal display device and makes the pattern more visible under all different types of lighting conditions. The front and rear plates which are utilized in the liquid crystal display device are made in such a manner that they can withstand high temperatures so that a high temperature material such as glass frit can be utilized for retaining the liquid crystal material.

We claim:

1. In a liquid crystal display device, a substantially transparent insulative front plate having front and rear surfaces, a first combination coating disposed on said rear surface of the front plate and including at least one antireflection layer and an electrically conducting layer, an insulative back plate having front and rear surfaces, a second combination coating on the front surface of the back plate including an electrically conducting layer and an interference stack, said conducting layers having patterns formed therein, means securing the front plate to the back plate so that the patterns are in registration with each other and to form a hermetically sealed space between the front and back plates, and a layer of liquid crystal material in said space and between said patterns carried by said front and back plates said first and second combination coatings serving to make the patterns substantially invisible when the device is inactivated.

2. A device as in claim 1 in which said second combination coating includes a dielectric reflecting stack.

3. A device as in claim 1 in which said second combination coating includes at least one antireflection layer.

4. A device as in claim 1 wherein said front and back plates are formed of glass and wherein said securing means is a glass frit.

5. A display device as in claim 1 wherein said first combination coating consists of first and second substantially transparent antireflecting layers with one of the layers being formed of a high index material and the other of the layers being formed of a low index material, said layer of conducting material being carried by the first and second antireflecting layers, said combination layer having a substantially uniform appearance throughout so that the patterns will not be visible when the display device is not activated.

6. A display device as in claim 5 wherein said layer of high index material has a quarter wave optical thickness for the design wavelength of approximately 140 nanometers and said layer of low index material has a quarter wave optical thickness for the design wavelength of approximately 193 nanometers and wherein said layer of conducting material in said first combination coating has an optical thickness of approximately 1,100 nanometers.

7. A device as in claim 6 wherein said high index material is titanium dioxide, said low index material is magnesium fluoride and said conducting material in said first combination coating is indium oxide whereby said coating is slightly bluish in color and wherein the patterns are virtually indistinguishable in the wavelength region of 400 to 700 nanometers.

8. A device as in claim 2 wherein said stack is formed of alternate layers of high and low index dielectric materials.

9. A device as in claim 8 wherein at least seven or more layers are provided in said stack to obtain the desired reflectivity.

10. A device as in claim 8 wherein the layers of high index material are formed of titanium dioxide and wherein said layers of low index material are formed of silicon dioxide.

11. A device as in claim 2 wherein the reflectivity of the dielectric stack is greater than 90 percent in the region of greatest eye sensitivity at the center of the visual spectrum.

12. A device as in claim 1 wherein the conducting layers are formed of indium oxide.

13. A device as in claim 1 together with an antireflection coating disposed on the front surface of the front plate.

* * * * *

UNITED STATES PATENT OFFICE
CERTIFICATE OF CORRECTION

Patent No. 3,736,047            Dated May 29, 1973

Inventor(s) Robert M. Gelber and Edward A. Small, Jr.

It is certified that error appears in the above-identified patent and that said Letters Patent are hereby corrected as shown below:

IN THE TITLE:

Cancel "CASTING" and substitute therefor "COATINGS"

Signed and sealed this 1st day of January 1974.

(SEAL)
Attest:

EDWARD M. FLETCHER, JR.        RENE D. TEGTMEYER
Attesting Officer               Acting Commissioner of Patents